United States Patent [19]

Watanabe

[11] Patent Number: 5,125,445
[45] Date of Patent: Jun. 30, 1992

[54] RADIAL TIRE FOR AIRCRAFT

[75] Inventor: Jun Watanabe, Kodaira, Japan

[73] Assignee: Bridgestone Corporation, Tokyo, Japan

[21] Appl. No.: 548,215

[22] Filed: Jul. 5, 1990

[30] Foreign Application Priority Data

Jul. 6, 1989 [JP] Japan .................. 1-175135

[51] Int. Cl.$^5$ .............................................. B60C 3/00
[52] U.S. Cl. ................... 152/454; 152/539; 152/552
[58] Field of Search ............... 152/454, 539, 543, 548, 152/552, 553, 554, 560

[56] References Cited

U.S. PATENT DOCUMENTS

| 4,513,802 | 4/1985 | Togashi et al. | |
|---|---|---|---|
| 4,813,467 | 3/1989 | Hinkel et al. | |
| 4,832,101 | 5/1989 | Welter | 152/553 |

FOREIGN PATENT DOCUMENTS 0174147 3/1986 European Pat. Off. .

Primary Examiner—Michael W. Ball
Assistant Examiner—Nancy T. Krawczyk
Attorney, Agent, or Firm—Oliff & Berridge

[57] ABSTRACT

A radial tire for aircraft includes an up carcass layer having organic fibers and wound around a bead core from inside towards outside; and a down carcass layer having organic fibers and wound around the bead core from outside forwards inside so as to cover the up carcass layer. The up carcass layer is formed into a rectilinear configuration radially from a position in which the up carcass layer is wound around the bead core, in a cross section taken radially of an axis of rotation of the tire, in a static state in which the inflation pressure of the tire corresponds to 5% or less of a nominal inflation pressure of the tire. The percentage of a radial height of the up carcass layer from a tire rim to a rectilinear terminating portion of the up carcass layer with respect to the height of a tire section is set to a range which is not less than a value in which the percentage of the nominal width of the rim to the nominal width of the tire is divided by 4 and 10 is added thereto, and which is not more than a value in which the percentage of the nominal width of the rim to the nominal width of the tire is divided by 4 and 20 is added thereto. Hence, the tension of a portion of the carcass in the vicinity of the bead core of the radial tire for aircraft becomes high, so that a pressure strain is reduced.

5 Claims, 9 Drawing Sheets

SPECIMEN (3)

SPECIMEN (3)

SPECIMEN (9)

SPECIMEN (5)

SPECIMEN (6)

SPECIMEN (10)

SPECIMEN (11)

SPECIMEN (1)

SPECIMEN (7)

RADIAL TIRE FOR AIRCRAFT

BACKGROUND OF THE INVENTION

1. Field of the Invention

The present invention relates to a radial tire for aircraft.

2. Description of the Related Art

Tires for aircraft are required to have sufficient durability to withstand high-speed and heavy loads since they are subjected to a large impact (fall) at high speed at the time of the take-off and landing of the aircraft. In addition, since present-day aircraft frequently taxi a relatively long distance in airports, tires for aircraft are required to have high performance in terms of both durability and traveling performance during taxiing in the same way as tires used for general vehicles.

For this reason, it has been conceived to use radial tires as aircraft tires by taking into consideration various performances such as wear resistance, heat resistance, and fatigue resistance against repeated loads, as well as various conditions such as weight and cost.

Under conditions of use in which a large strain takes place in tires such as aircraft tires, it is known that a portion of the tire abutting against a rim flange is liable to undergo friction by the rim flange and become worn. This phenomenon is liable to occur more frequently in the case of radial tires than in the case of conventional bias-ply tires.

As a means for overcoming the wear of the abutting portion caused by the rim flange in the case of radial tires, a method generally adopted is to reinforce a portion of the carcass located close to the rim flange. In accordance with this method, the weight of the tires increases, so that it is not a desirable method for aircraft tires that are required to be reduced in weight.

In addition, with the tires having a carcass including an up carcass layer and a down carcass layer, since the up carcass layer is wound around a bead core from inside towards outside and the down carcass layer is wound around the bead core from outside towards inside, this structure is effective in preventing the carcass layers from being pulled off for the tires used under high inflation pressure. However, with the tires of a type having a carcass with this structure, carcass-reinforcing cords are likely to undergo fatigue in the vicinity of the bead portion.

SUMMARY OF THE INVENTION

Accordingly, an object of the present invention is to provide a radial tire for aircraft which makes it possible to overcome wear of surface rubber in the vicinity of a rim flange caused by chafing with flange of the rim, without increasing the weight of the tire.

Another object of the present invention is to provide a radial tire for aircraft which effectively prevents the fatigue of carcass cords in the vicinity of bead portion of tire having an arrangement of the up and down carcass layers.

To these ends, in accordance with the present invention, there is provided a radial tire for aircraft comprising: at least one up carcass layer having organic fibers and being wound around a bead core from inside towards outside; and at least one down carcass layer having organic fibers and being wound around the bead core from outside towards inside over the wound portion of the up carcass layer, wherein the up carcass layer is formed into a rectilinear configuration radially from a position in which the up carcass layer is wound around the bead core, in a cross section taken radially of an axis of rotation of the tire, in a static state in which the inflation pressure of the tire corresponds to 5% or less of a nominal inflation pressure of the tire; and wherein a percentage derived by dividing radial height of the up carcass layer, from the tire rim to the end of a rectilinear portion of the up carcass layer extending from the tire rim by the radial height of a tire section is set to a range which is not less than a percentage value calculated by dividing the ratio of the nominal width of the rim to the nominal width of the tire by 4 and adding 10 percentage points thereto, and which is not more than a percentage value which is calculated by dividing the ratio of the nominal width of the rim by the nominal width of the tire by 4 and adding 20 percentage points thereto.

It is well known that if, as in the case of a radial tire for aircraft in accordance with the present invention, a tire is inflated with air under high inflation pressure and cords of organic fibers, i.e., stretchable cords, are used as reinforcing members, the configuration of a side wall of the inflated tire assumes a state of so-called natural equilibrium as expressed by the following formula:

$$Z = \int_R^{RD} \frac{\sin\Phi_D (R^2 - RC^2)}{\sqrt{(RD^2 - RC^2)^2 - \sin^2\Phi_D (R^2 - RC^2)^2}} dR$$

where:

Z is the distance to the carcass measured from a plane which passes through a belt end and is parallel to an equatorial plane R is the distance measured radially from an axis of rotation of the tire RD is the distance measured radially from the axis of rotation of the tire to the belt end RC is the distance up to a point at which the distance Z measured radially from the axis of rotation of the tire is maximum $\Phi_D$ is the tangential angle of a carcass at the belt end with respect of the equatorial plane measured radially at the belt end As is a conventional method of designing the configuration of a radial tire, a method has been generally adopted in which a cross-sectional configuration of the carcass is formed into a configuration of natural equilibrium and tension occurring in the carcass due to the internal pressure becoming equal at all locations.

Meanwhile, if the configuration of a portion of the carcass is rectilinear under a low internal pressure as in the case of the radial tire for aircraft in accordance with the present invention, this rectilinear portion tends to approach its configuration of natural equilibrium when the tire is inflated under a nominal inflation pressure. As a result, the tire is provided with a locally high tension.

With the tire of a type having a carcass including an up carcass layer wound around a bead core from inside toward outside and a down carcass layer wound around the bead core from outside toward inside, the down carcass layer closer to the bead is prone to be subjected to a compressive force due to the load acting upon the tire, and the cords of organic fibers, when subjected to a compressive strain, are quite liable to undergo fatigue. With the radial tire for aircraft in accordance with the present invention, the tension occurring in the carcass in the vicinity of the bead becomes high, so that the compressive strain is reduced.

In addition, since the tension occurring in the carcass in the direction of the cords increases, the shearing strength of the radial tire in the rotation direction of the carcass increases. Hence, the side walls of the tire are provided with a high shearing strength, the shearing deformation of the side walls in the rotating direction thereof as the tire rotates is reduced, hence leading to a reduction in the tire wear caused by chafing with the rim flange.

Furthermore, the rectilinear portion of the up carcass layer is set to the aforementioned range. If the rectilinear portion is formed into a rectilinear configuration up to a point exceeding the upper limit of the range, the curvature of the shoulder portion becomes large, with the result that rubber is concentrated in the shoulder portion when vulcanization is effected in a mold, and a lack of vulcanization pressure and, hence, a shortage of vulcanization of the rubber result as air remains between a bladder and green tire. In addition, if the rectilinear portion is formed into a rectilinear configuration with a height shorter than a lower limit of the aforementioned range, the tension which takes place in the carcass in the vicinity of the bead owing to the inflation pressure of the tire cannot be increased effectively. Accordingly, a range which is capable of satisfying the aforementioned two factors, i.e., sufficient vulcanization of the rubber and sufficient carcass tension, becomes the aforementioned range.

DESCRIPTION OF THE PREFERRED EMBODIMENTS

Figure 1:
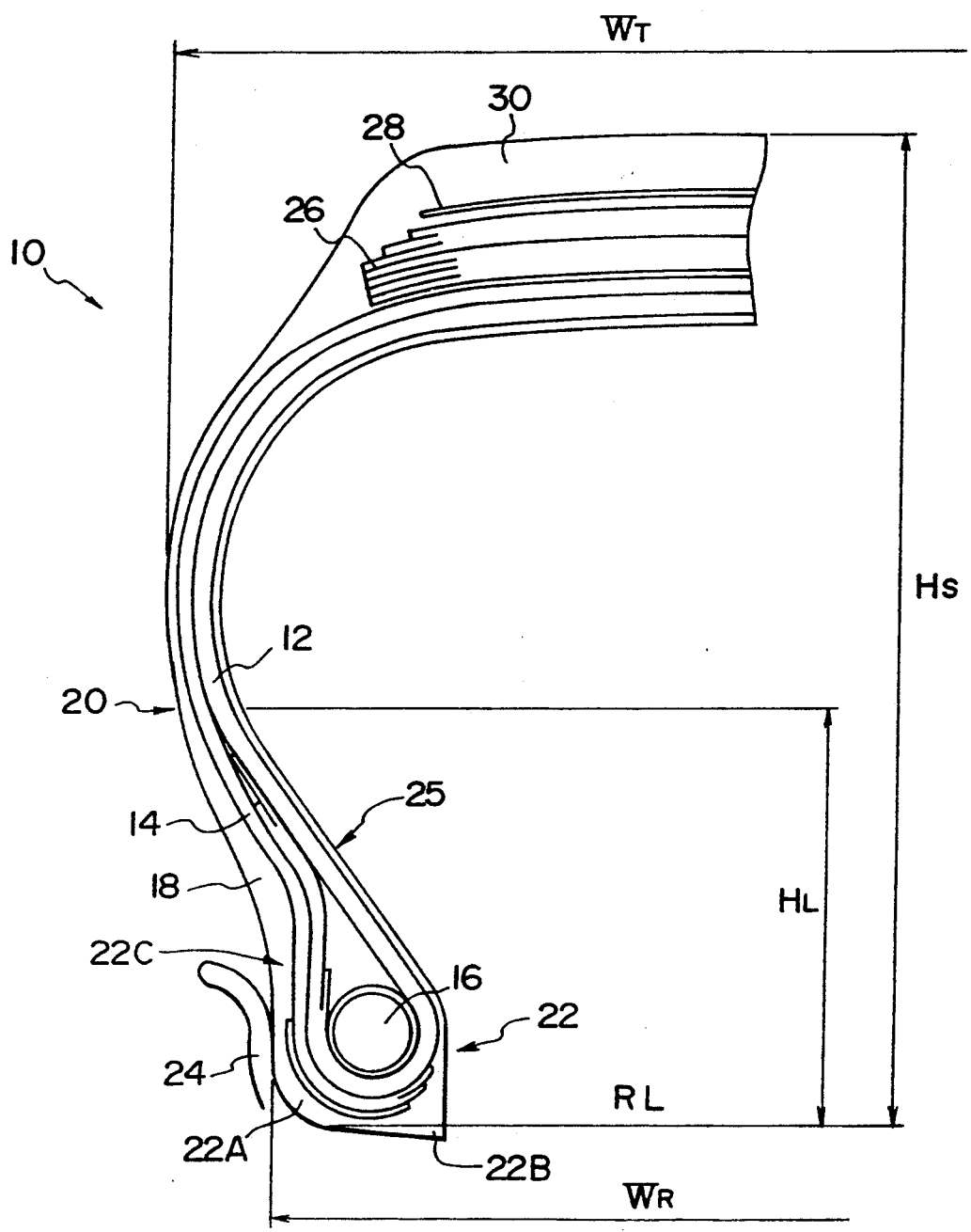
FIGS. 1 and 2 are cross-sectional views of essential portions of radial tires for aircraft in accordance with an embodiment of the present invention.
Figure 2:
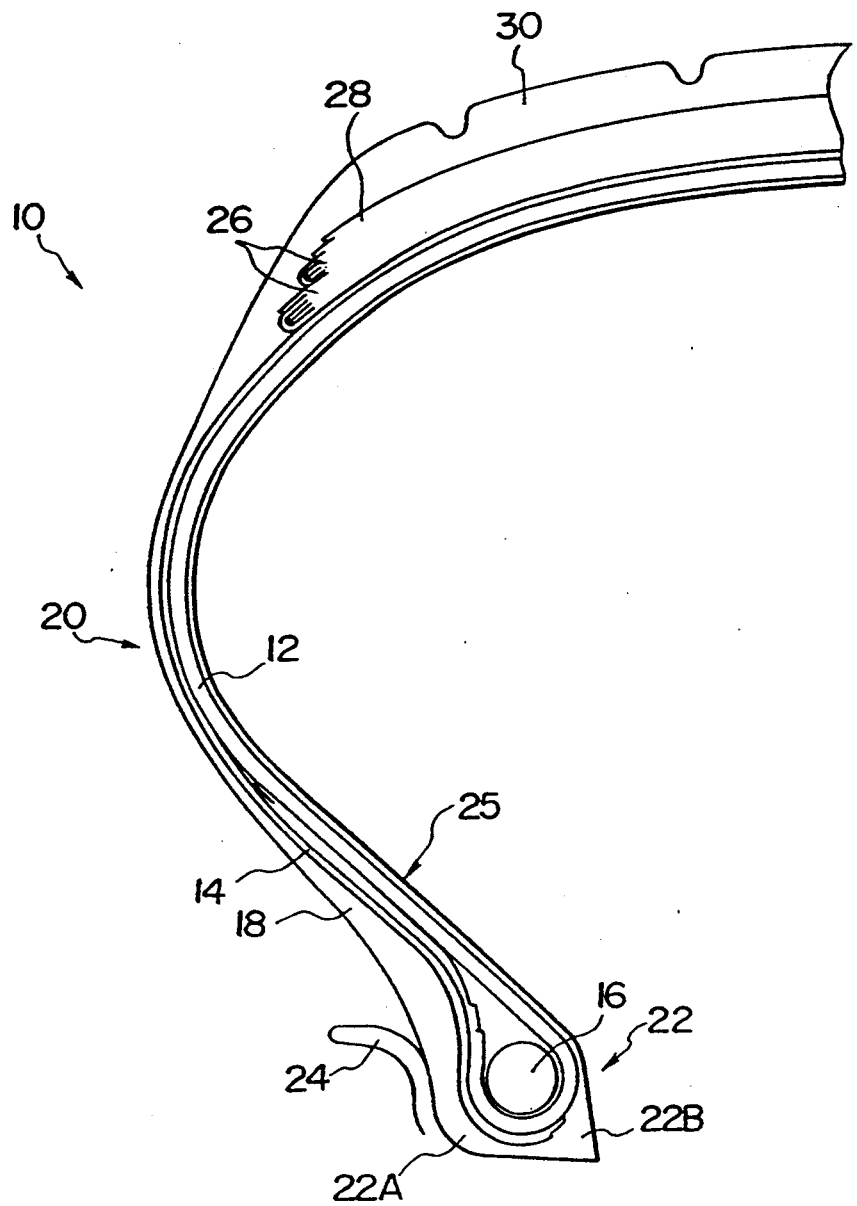

FIGS. 1 and 2 illustrate a cross-sectional view of an essential portion of a radial tire for aircraft 10 taken radially of an axis of rotation of the tire.

This radial tire 10 has an up carcass layer 12 and a down carcass layer 14 that serve as reinforcing members for maintaining an inflation pressure provided by inflating the tire with air. Each of the carcass layers 12 and 14 is composed of carcass plies in which carcass cords formed by industrial organic fibers (such as nylon, polyester, and aramid fibers) are arranged radially about the axis of rotation of the tire and covered with a rubber layer.

The up carcass layer 12 has an end portion that is wound around a bead core 16 from inside towards outside, and an end portion of the down carcass layer 14 is wound around from outside towards inside so as to cover the wound end portion of the up carcass layer 12. As used herein and in the claims, the terms "axial" and "axially" refer to directions which are parallel to the axis of rotation of the tire, and the terms "radial" and "radially" refer to directions that are perpendicular to the axis of rotation of the tire.

The outer periphery of each of the carcass layers wound around the bead core 16 is covered with a rubber layer 18, thereby constituting a part of a side wall 20 and a bead portion 22. The bead portion 22 serves to determine the size of the inner circumferential periphery of the radial tire 10 and is fitted to a rim 24.

Here, the up carcass layer 12 which is wound around the bead core 16 and constitutes a part of the side wall 20 has a rectilinear portion 25 formed into a rectilinear configuration continuously and radially from a position in which it is wound around the bead core 16 in a static state in which the inflation pressure of the tire corresponds to 5% or less of a nominal inflation pressure of the tire 10. Furthermore, the rectilinear portion 25 of the up carcass layer 12 is restricted to the following range:

If it is assumed that $W_T$ is the nominal width of the tire $W_R$ is the nominal width of the rim $R_W$ is $W_R/W_T \times 100$ $H_L$ is the radial height of the up carcass layer from the tire rim 24 to the rectilinear terminating portion of the up carcass layer $H_S$ is the height of the tire section, i.e., (nominal outside diameter of the tire—nominal diameter of the rim)/2

$R_H$ is $H_L/H_S \times 100$

RL is a nominal diameter of the rim then the percentage (i.e., $R_H$) of the radial height of the rectilinear portion 25 of the up carcass layer, $H_L$, with respect to the height of the tire section, $H_S$, is set to a range which is not less than a value in which the percentage to the nominal width of the rim, $W_R$, to the nominal width of the tire $W_T$, is divided by 4 and 10 is added thereto, and which is not more than a value in which the percentage of the nominal width of the rim, $W_R$, to the nominal width of the tire, $W_T$, is divided by 4 and 20 is added thereto.

In other words a range of $$R_W/4 + 10 \leq R_H \leq R_W/4 + 20$$

In this case, FIG. 1 shows a radial tire whose tire size is "30×8.8R15", i.e., one in which the nominal width of the tire, $W_T$, is 8.8 inches, the nominal width of the rim, $W_R$, is 7.0 inches, the height of the tire section, $H_S$, is 7.5 inches, and $R_H$ is 35%. Also, FIG. 2 shows a radial tire whose tire size is "H46×1.80R20", i.e., one in which the nominal width of the tire, $W_T$, is 18.0 inches, the nominal width of the rim, $W_R$, is 11.0 inches, the height of the tire section, $H_S$, is 11.5 inches, and $R_H$ is 34%.

A plurality of belt layers 26 are disposed along the down carcass layer 14 radially outwardly of a radially outward end portion of the radial tire 10 so as to ensure rigidity. In addition, a protective layer 28 formed of aramid cords or the like is disposed radially outwardly of the belt layers 26 so as to ensure resistance to cut. A tread portion 30 formed of a thick rubber layer is disposed radially outwardly of the protective layer 28. The tread portion 30 is a portion which is actually brought into contact with the ground, so that it is provided with a sufficient thickness to withstand abrasion and damage.

The operation of this embodiment will be described hereinunder.

In the radial tire 10 for aircraft arranged as described above, when it is inflated with air under a nominal inflation pressure, the tension of the rectilinear portion 25 increases owing to the inflation pressure of the tire. For this reason, the circumferential rigidity of the carcass layers improves in the vicinity of the position in which the carcass layers are wound around the bead core 16.

In consequence, the circumferential movement of the up carcass layer 12 and the down carcass layer 14 which takes place as the tire rolls is reduced, the tire wear caused by chafing with the rim flange in the vicinity of a bead rear portion 22C is prevented. In addition, since the tension increases, the compressive strain which takes place in the down carcass layer 14 when a load is applied thereto is reduced, so that the resistance to fatigue is also improved.

Figure 3:
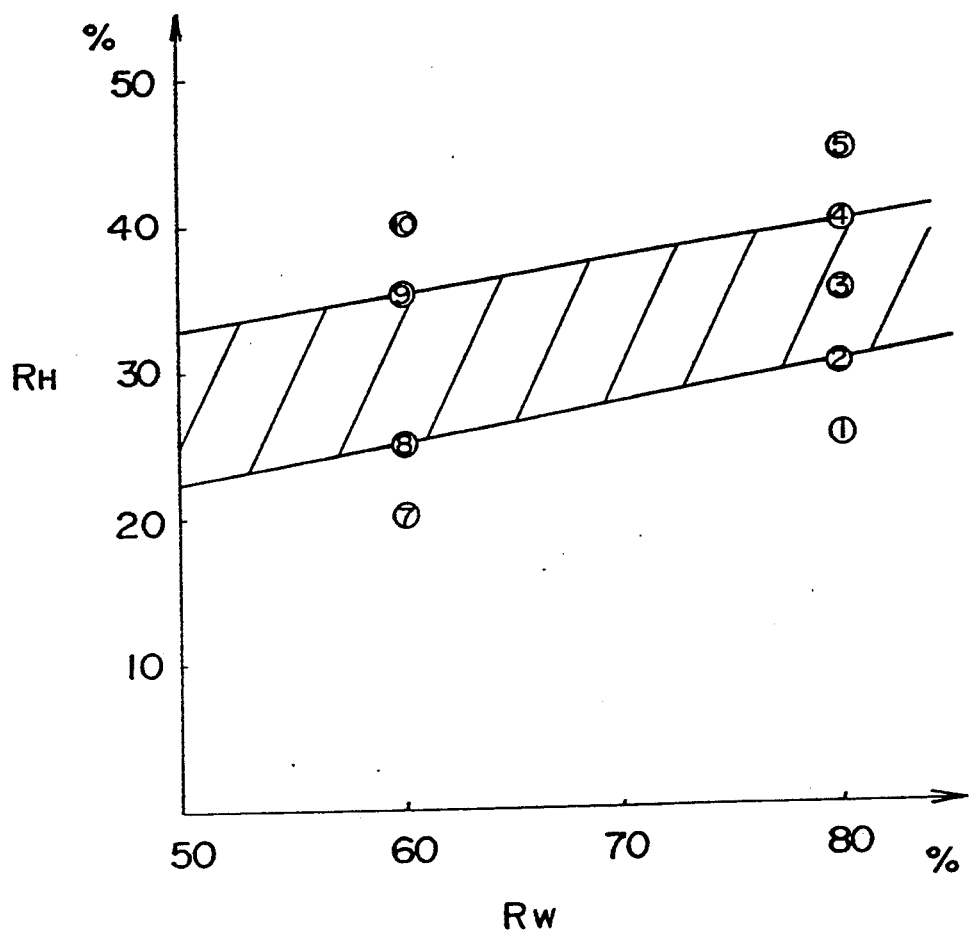
FIG. 3 is a graph illustrating test data on radial tires in which the range of a rectilinear portion of an up carcass layer is altered variously.

Table 1 shows the test data of the radial tire 10 in which the percentage (i.e., $R_H$) of the radial height of the rectilinear portion 25, $H_L$, of the up carcass layer 12 with respect to the height of the tire section, $H_S$, is altered variously. FIG. 3 shows the test data as a graph.

fatigue of the carcass in the vicinity of the bead is improved.

What is claimed is:

1. A radial tire for aircraft comprising:

at least one up carcass layer in which cords formed of organic fibers are arranged radially about an axis of rotation of said tire and are embedded in a rubber layer, said up carcass layer being wound around a bead core from inside towards outside; and at least one down carcass layer in which cords formed of organic fibers are arranged radially about the axis of rotation of said tire and are embedded in a rubber layer, said down carcass layer

TABLE 1

| Item Specimen | Tire Size | RW (%) | LH (%) | Tire Wear[2] Caused by Rim (mm) | Residual[3] Strength of Down Carcass Layer (%) | Defective Tire Manufactured |
|---|---|---|---|---|---|---|
| (1) | 30 × 8.8 R15 | 79.5 | 25 | 2.0 | 85 | none |
| (2) | WT: 8.8" | " | 30 | 1.5 | 91 | none |
| (3) | WR: 7.0" | " | 35 | 1.3 | 91 | none |
| (4) | HS: 7.5" | " | 40 | 1.1 | 93 | none |
| (5) |  | " | 45 | 1.1 | 92 | Rubber cracking occurred in a shoulder portion due to a lack of vulcanization pressure. |
| (6)[1] |  | " | 0 | 2.0 | 85 | none |
| (7) | H46 × 18.0 R20 | 61.1 | 20 | 1.2 | 82 | none |
| (8) | WT: 18.0" | " | 25 | 0.8 | 88 | none |
| (9) | WR: 11.0" | " | 34 | 0.6 | 91 | none |
| (10)[1] | HS: 11.5" | " | 40 | 0.6 | 94 | Rubber cracking occurred in a shoulder portion due to a lack of vulcanization pressure. |
| (11)[1] |  | " | 0 | 2.4 | 82 | none |

[1] A conventional product designed with a carcass line set in a state of natural equilibrium.
[2] A depth of a locally worn portion of rubber at a bead rear portion when the tire is run 400 times at a speed of 20 mph and for eight minutes each under a 80% load of a normal load.
[3] A comparison between the strength of carcass cords taken out from the tire subjected to the same test as [2] on the one hand, and the strength of carcass cords taken out from a new tire on the other As is apparent from the table and the graph, when the rectilinear portion 25 of the up carcass layer 12 is set to the aforementioned range, the amount of tire wear caused by chafing with the rim flange is reduced and the residual strength of the down carcass layer 14 is improved in accordance with the present invention.

Figure 4:
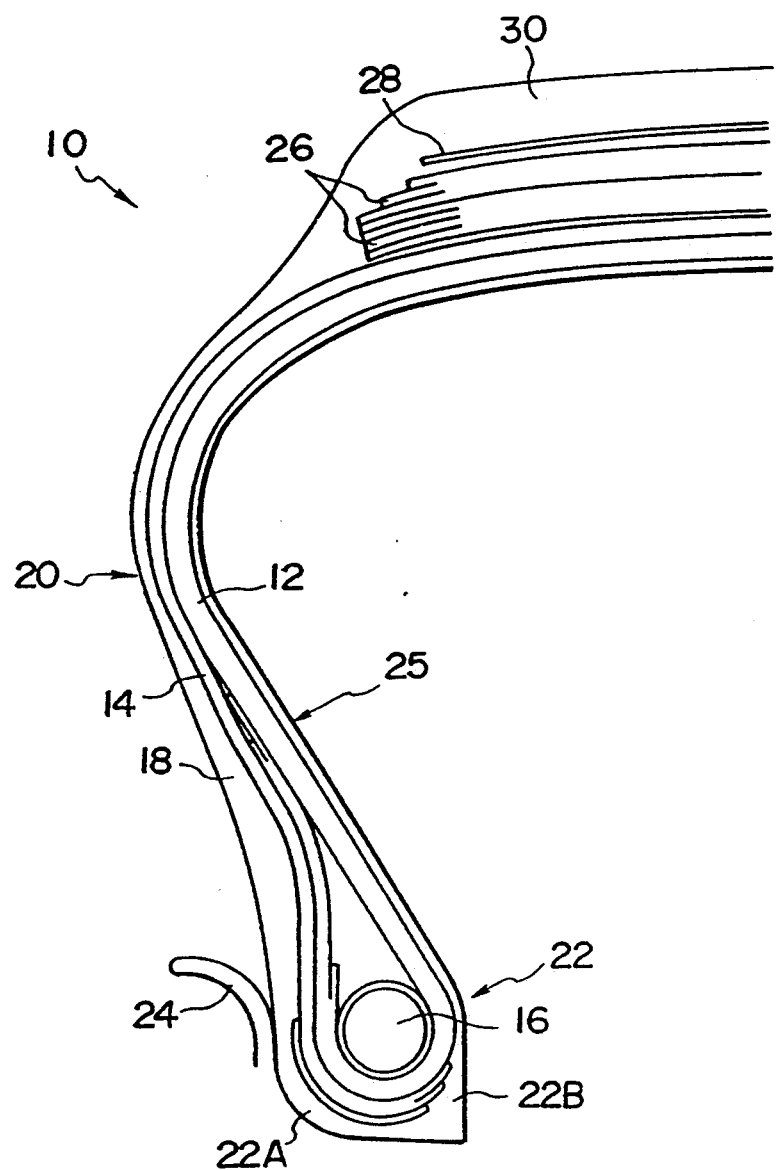
FIGS. 4 to 9 are cross-sectional views of essential portions of tires corresponding to the test data.
Figure 5:
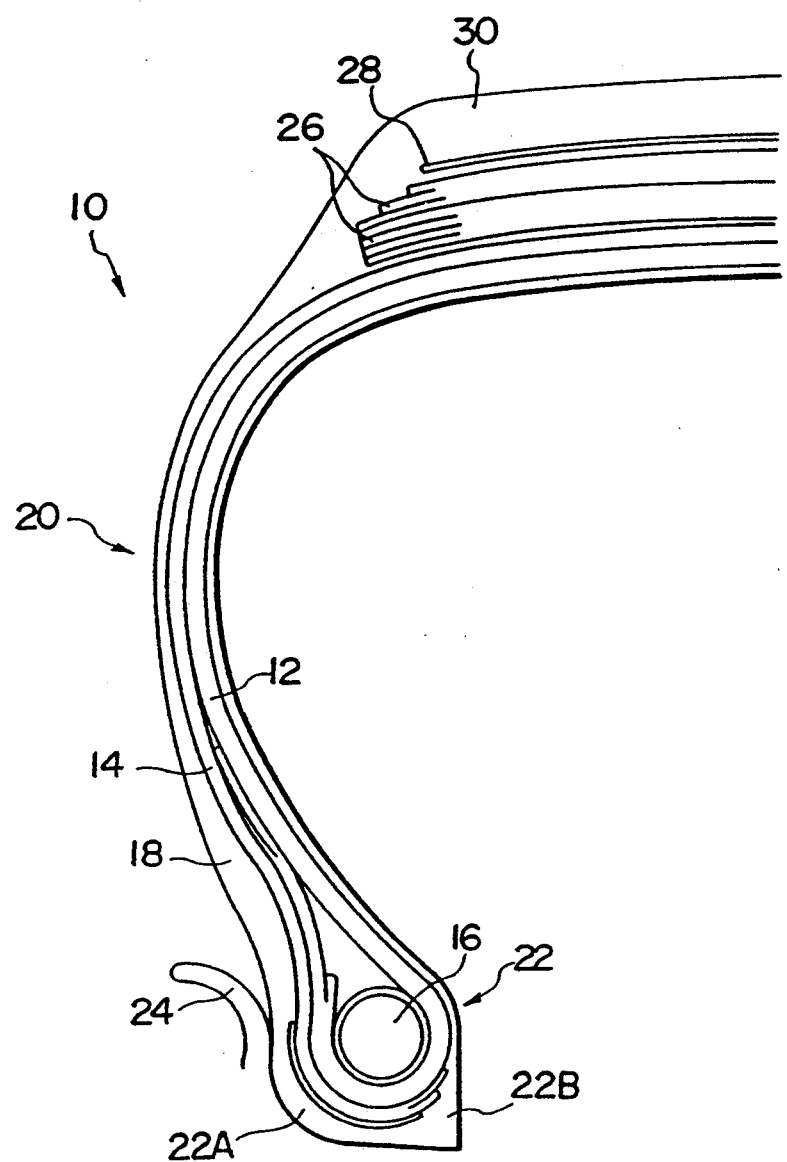
Figure 6:
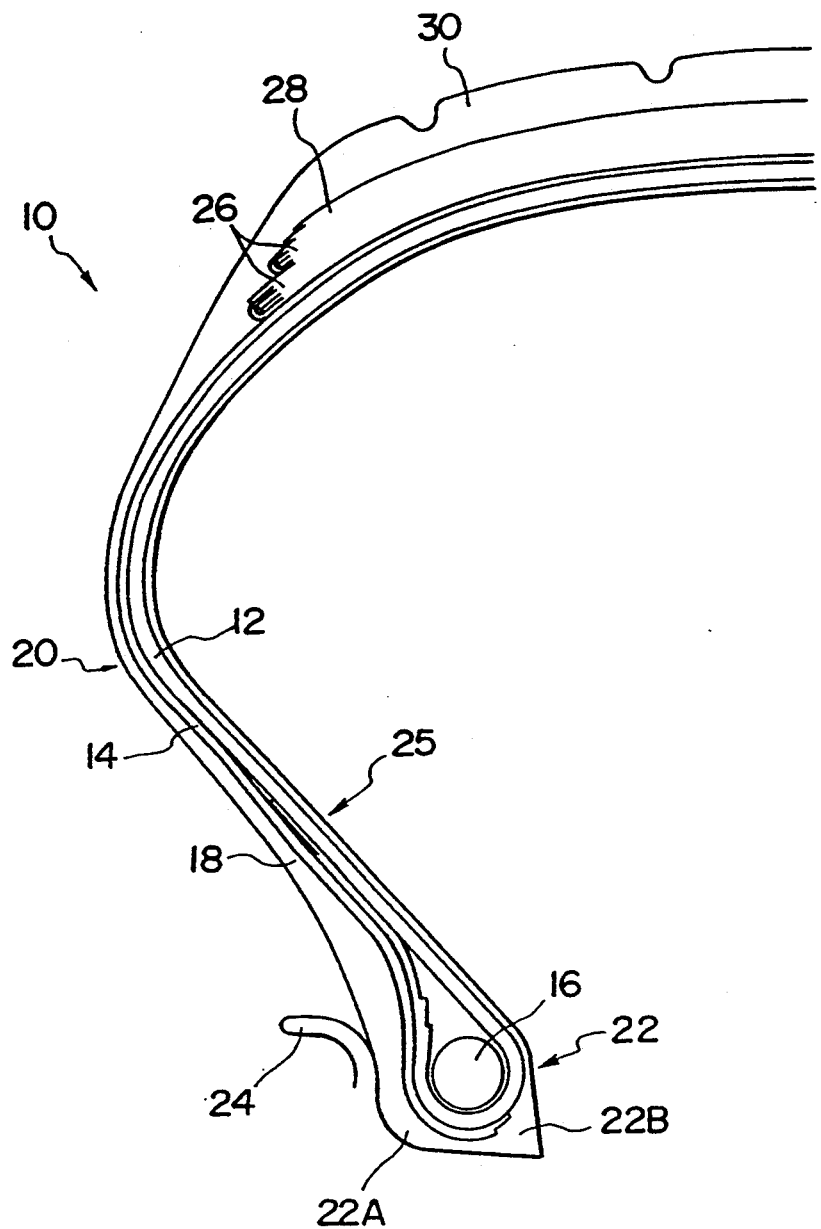
Figure 7:
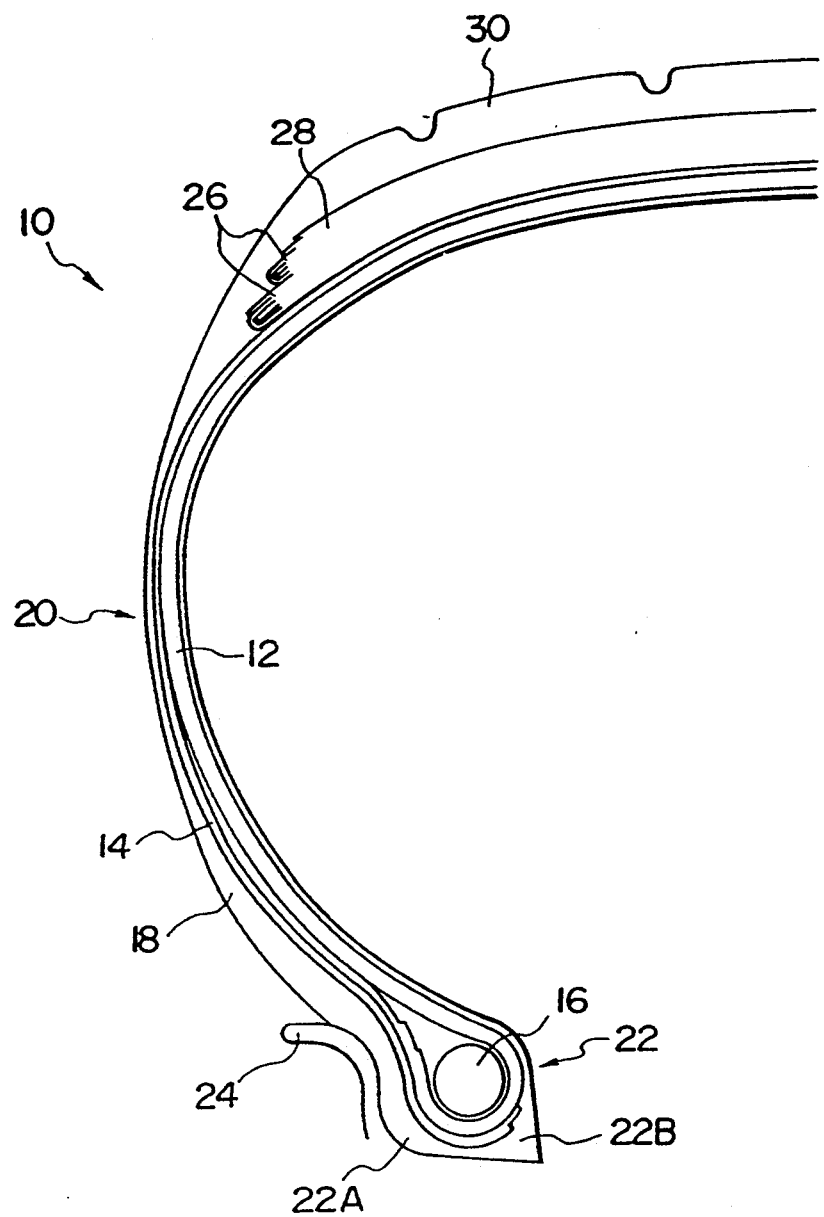
Figure 8:
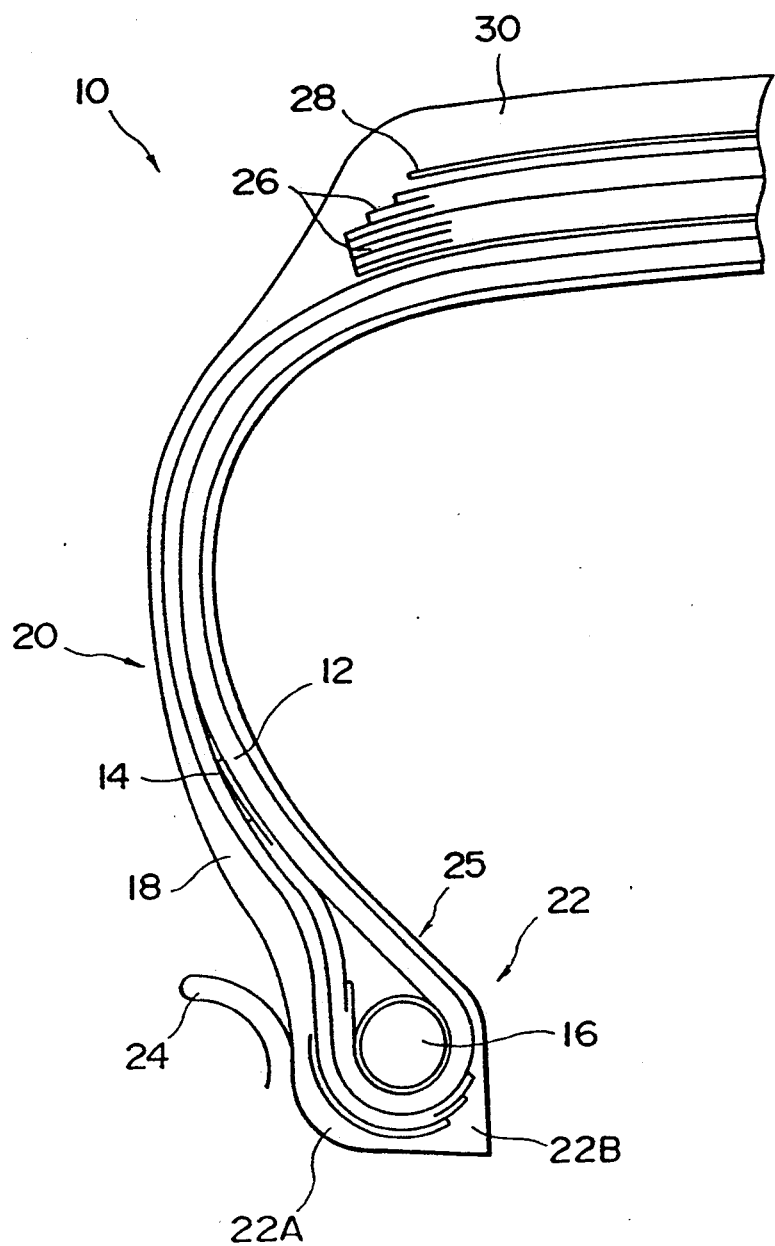
Figure 9:
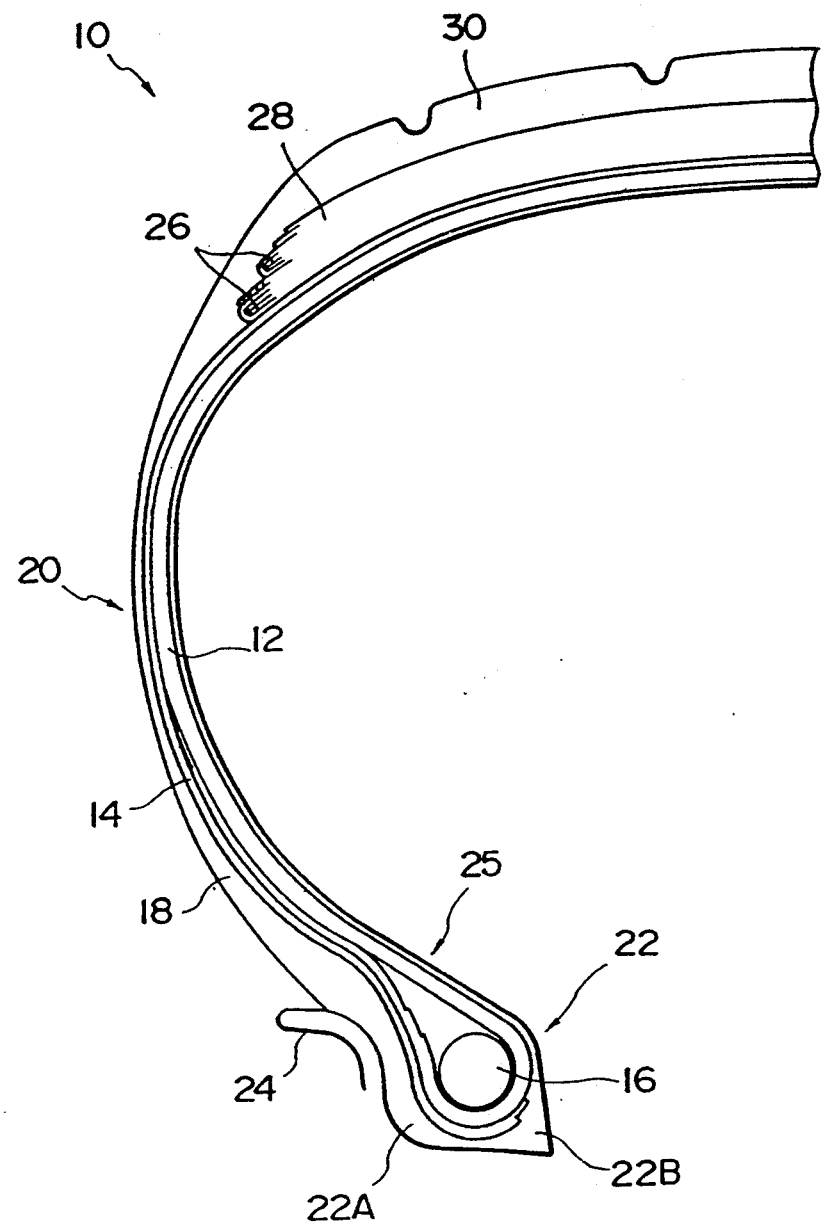

If the rectilinear portion 25 of the up carcass layer 12 is formed rectilinearly with a height exceeding an upper limit of the aforementioned range (e.g., in the cases of data (5) shown in FIG. 4 and data (10) shown in FIG. 6), the curvature of a shoulder portion becomes large, with the result that rubber is concentrated in the shoulder portion when vulcanization is effected in a mold, and a lack of vulcanization pressure and, hence, a shortage of vulcanization of the rubber result as air remains between a bladder and green tire. In addition, if the rectilinear portion 25 is formed into a rectilinear configuration with a height shorter than a lower limit of the aforementioned range (e.g., in the cases of data (1) shown in FIG. 8 and data (7) shown in FIG. 9), the tension which takes place in the carcass in the vicinity of the bead core 16 owing to the inflation pressure of the tire cannot be increased effectively. Accordingly, a range which is capable of satisfying the aforementioned two factors, i.e., the sufficient vulcanization of the rubber and the sufficient carcass tension, becomes the aforementioned range.

As described above, the radial tire for aircraft in accordance with the present invention has outstanding advantages in that the tire wear caused by chafing with the rim flange is prevented and that the resistance to being wound around said bead core from outside towards inside, so as to cover the wound portion of said up carcass layer, wherein the axially inner portion of said up carcass layer is formed into a rectilinear configuration radially from a rectilinear terminating portion to a position in which said up carcass layer is wound around said bead core, in a cross section taken radially of an axis of rotation of said tire, in a static state in which the inflation pressure of said tire corresponds to 5% or less of a nominal inflation pressure of said tire; and wherein the termination of said rectilinear configuration of said up carcass layer is defined by the range:

$$R_w/4 + 10 \leq R_H \leq R_w/4 + 20$$

wherein:

$W_T$ is the nominal width of the tire;
$W_R$ is the nominal width of the rim;
$R_W$ is the $W_R/W_T \times 100$;
$H_L$ is the radial height of the up carcass layer from the tire rim to the rectilinear terminating portion of the up carcass layer;
$H_S$ is the height of the tire section; and
$R_H$ is the $H_L/H_S \times 100$.

2. A radial tire for aircraft according to claim 1, further comprising at least one belt layer disposed radially outwardly of said down carcass layer.

3. A radial tire for aircraft according to claim 2, further comprising at least one protective layer disposed radially outwardly of said belt layer.

4. A radial tire for aircraft according to claim 3, wherein said protective layer has aramid cords.

5. A radial tire for aircraft according to claim 1, wherein said organic fibers are selected from the group consisting of nylon, polyester, and aramid fibers.

* * * * *